(12) United States Patent  (10) Patent No.: US 9,350,150 B2
Clark-Mantle  (45) Date of Patent: May 24, 2016

(54) CASING SYSTEM WITH CABLE RETAINER FOR ELECTRONIC DEVICE CHARGERS

(71) Applicant: Necia Clark-Mantle, South Jordan, UT (US)

(72) Inventor: Necia Clark-Mantle, South Jordan, UT (US)

( * ) Notice: Subject to any disclaimer, the term of this patent is extended or adjusted under 35 U.S.C. 154(b) by 0 days.

(21) Appl. No.: 14/209,878

(22) Filed: Mar. 13, 2014

(65) Prior Publication Data

US 2014/0263869 A1  Sep. 18, 2014

Related U.S. Application Data

(60) Provisional application No. 61/779,545, filed on Mar. 13, 2013.

(51) Int. Cl.
*H01R 13/72* (2006.01)
*H02G 3/08* (2006.01)
*H01R 13/60* (2006.01)

(52) U.S. Cl.
CPC ............... *H02G 3/086* (2013.01); *H01R 13/72* (2013.01); *H01R 13/60* (2013.01); *Y10T 29/49826* (2015.01)

(58) Field of Classification Search
USPC .................. 248/686, 682, 51; 439/502, 501, 4
See application file for complete search history.

(56) References Cited

U.S. PATENT DOCUMENTS

| | | | | |
|---|---|---|---|---|
| 3,775,729 A * | 11/1973 | Casper | ........................... | 439/459 |
| 4,424,407 A * | 1/1984 | Barbic | ........................... | 174/67 |
| 4,647,735 A * | 3/1987 | Sicher | ........................ | 200/43.08 |
| 4,921,444 A * | 5/1990 | Cama | ........................... | 439/528 |
| 5,041,000 A * | 8/1991 | Shotey | ........................ | 439/147 |
| 5,329,603 A * | 7/1994 | Watanabe et al. | ............... | 385/86 |
| 6,317,933 B1 * | 11/2001 | Suenaga | ........................ | 24/16 R |
| 6,349,452 B1 * | 2/2002 | Cisneros | ........................ | 24/306 |
| 6,523,229 B2 * | 2/2003 | Severson | .................... | 24/16 PB |
| 6,567,277 B1 | 5/2003 | Doherty | | |
| 2002/0025703 A1 * | 2/2002 | Chen | ........................... | 439/141 |
| 2004/0069920 A1 * | 4/2004 | W. Dirks | .................... | 248/316.7 |
| 2004/0075989 A1 | 4/2004 | Wong | | |
| 2005/0202709 A1 * | 9/2005 | Campbell et al. | ............. | 439/373 |
| 2011/0009003 A1 | 1/2011 | Youssefi-Shams | | |
| 2013/0237088 A1 * | 9/2013 | Sathyanarayana et al. | ... | 439/521 |

FOREIGN PATENT DOCUMENTS

GB  2161836 A  *  1/1986
JP  2012089422 A  *  5/2012

OTHER PUBLICATIONS

Michiel Cornelissen, "The Wrap". Jul. 27, 2012. Accessed from the Internet ,<URL: https://web.archive.org/web/20120727041113/http://www.michielcornelissen.com/The_Wrap_cable_winder_for_apple_iphone_charger_US.html>.

* cited by examiner

*Primary Examiner* — Alfred J Wujciak
(74) *Attorney, Agent, or Firm* — Gurr & Brande, PLLC; Robert A. Gurr

(57) ABSTRACT

The present disclosure is directed to systems and components for covering charger assemblies. In one embodiment, a casing system comprises a colored or decorative cover for an AC adapter (also known as an AC/DC converter, adapter block, or transformer block) and an extension for fastening the cable portion of the charger assembly to the AC adapter.

1 Claim, 3 Drawing Sheets

CASING SYSTEM WITH CABLE RETAINER FOR ELECTRONIC DEVICE CHARGERS

CROSS-REFERENCE TO RELATED APPLICATIONS

This application claims the benefit of U.S. Provisional Application Ser. No. 61/779,545, filed on Mar. 13, 2013, which is incorporated herein by reference.

TECHNICAL FIELD

The present disclosure relates to casing and storage systems. More specifically, the current disclosure relates to protective casings for charger assemblies and cables for electronic devices.

BACKGROUND

In a household with multiple people and multiple portable electronic devices such as cell phones, MP3 players, tablet computers, and laptop computers, there are typically a large number of charging assemblies associated with these devices. Because many charging assemblies are often identical or appear similar, a user needing a charge may simply use the first one available, rather than find the one which belongs to that device or to that user. This can obviously cause problems for a second user needing to charge a device if their charger is already in use or has been taken by another member of the household. Further, a user in a public area, such as schools and libraries, may have his/her charger taken by mistake due to this lack of identifiability.

Additionally, since many such charger assemblies are now made of multiple parts to allow for usage as a charger and as a connector to another device, it is easy for users to misplace a part of the charger assembly. A covering system that allows users to decorate or identify their charger assemblies while maintaining their ability to function would be an improvement in the art. Such a system that also provided a way to retain charger assembly components together for storage or travel would be a further improvement in the art.

SUMMARY OF EXAMPLE EMBODIMENTS

The present disclosure is directed to systems and components for covering charger assemblies. In one embodiment, a casing system comprises a colored or decorative cover for an AC adapter (also known as an AC/DC converter, adapter block, or transformer block) and an extension for fastening the cable portion of the charger assembly to the AC adapter.

In yet another embodiment, a casing system comprises a cover for the device connector portion (e.g., USB type connectors, Apple® Lighting connectors, etc.). Further, another embodiment may include a cover for the cable portion of a charger assembly.

DETAILED DESCRIPTION OF EXAMPLE EMBODIMENTS

The following descriptions depict only example embodiments and are not to be considered limiting of its scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various different sequences and arrangements while still falling within the scope of the present invention.

Figure 1A:
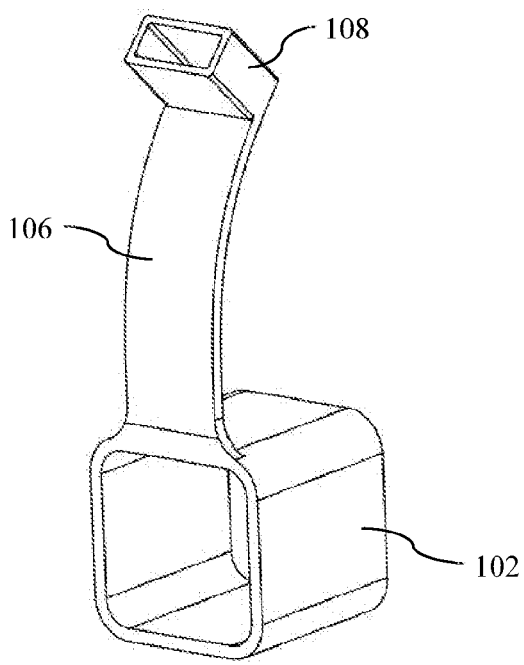
FIG. 1A is a front side perspective view of a casing system for a charging assembly
Figure 1B:
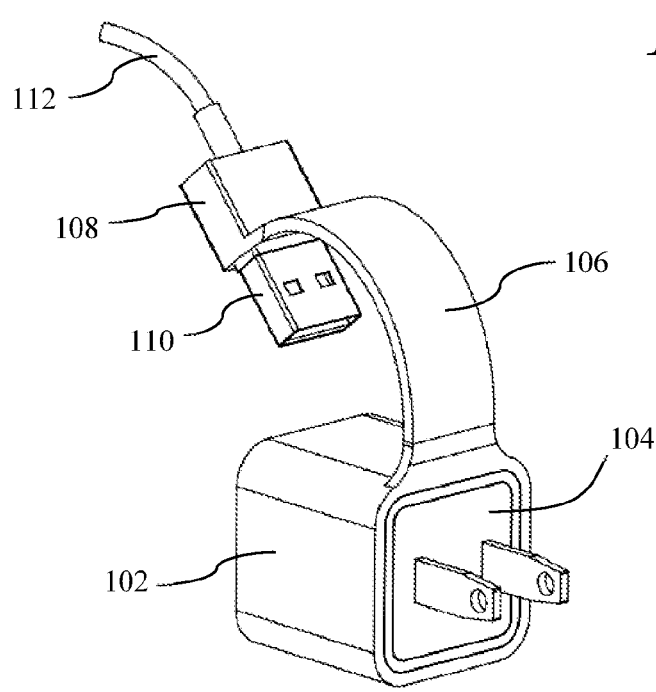
FIG. 1B is a front side perspective view of a casing system for a charging assembly coupled with a charging assembly

The present disclosure is directed to systems and components for covering charger assemblies. Charging assemblies are typically comprised of a transformer, a cable, and at least one connector. In one embodiment, as seen in FIGS. 1A and 1B, a casing system for a charger assembly comprises a cover 102 for an AC adapter 104 (also known as an AC/DC converter, adapter block, or transformer block). The cover 102 may be made from a variety of materials, such as rubbers, silicones, combinations such as Thermoplastic Polyurethane (TPU), or other flexible polymers that may be stretched around an AC adapter 104; however, the cover 102 may also be made from other materials such as cotton, lycra, nylon, or similar, and may be held in place either by elastics, hooks and loops (e.g., Velcro®), snaps, or other equivalent means. In some alternative embodiments, not shown, the cover may be formed of rigid materials, such as hard plastics, carbon fibers, or equivalents, and be "snap-fitted" around the AC adapter from individual pieces. In others, the cover may be formed using rigid materials and/or padding materials, in single or multiple pieces, which may vary based on the particular charger assembly and its particular design. Since an AC adapter contains a transformer that takes in electrical current at a first voltage (typically 120V in a US based system or a different standard voltage in a different geographic system, 220 in Europe, etc.) and outputs a smaller voltage through the USB receptacle (typically 8V), it can generate heat during its usage which is typically dissipated by radiating to the surroundings. Accordingly, the materials from which the cover is constructed, or the design thereof, should allow at least enough heat transmission therethrough to allow the AC adapter to function unimpaired. Additionally, such materials need to withstand any heat so generated. Further, the cover may be of uniform color, a variety of colors, or other decorative styles. This allows a user to customize his/her AC adapter, which makes it identifiable and less easily misplaced or taken by a third-party. The cover may also be made from more than one material. For example, in another embodiment (not shown), the cover may comprise an inner padded portion for protecting the AC adapter, while the outside may be of a different material, which may or may not be decorative and which may also be puncture resistant.

Figure 2:
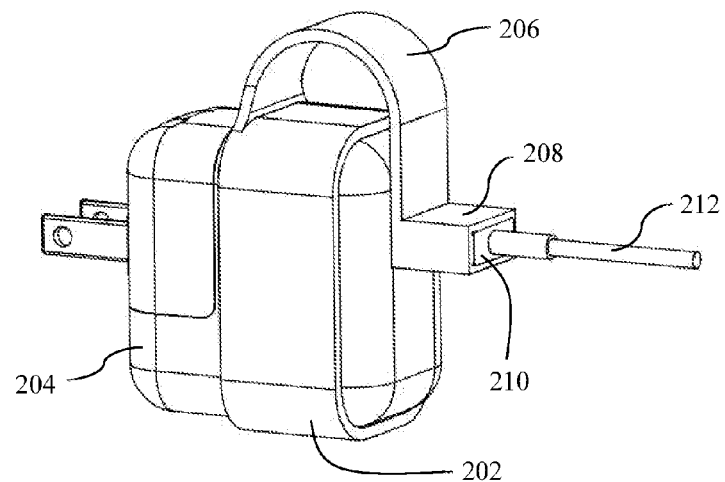
FIG. 2 is a rear side perspective view of a casing system for a charging assembly coupled with a larger AC adapter

Further, a means for fastening a cable 112 to an AC adapter 104 may be an extension 106. The extension 106 may be integrally formed with cover 102, minimizing risk of loss of the extension and adding the further benefit of having a single-manufactured part. However, the extension 106 may also be removably attachable using hooks and loops, snaps, or their equivalents. The extension 106 has a receiving end 108 for receiving a connector 110, such as a USB, Apple®, or other connector. As shown in FIG. 2, a cover 202 may take any size and shape, to thereby accommodate a variety of adapters 204. FIG. 2 further shows a connector 210 coupled with a receiving end 208 of extension 206 and engaged with the AC adapter 204, allowing a portable electronic device to be charged via cable 212. It will be appreciated that while the drawings generally illustrate Apple® connectors, USB connectors, and their accompanying AC adapters, differing shapes and sizes of adapters may be used and are specifically contemplated herein, such as those for use with laptop computers, tablets, and similar.

Figure 3:
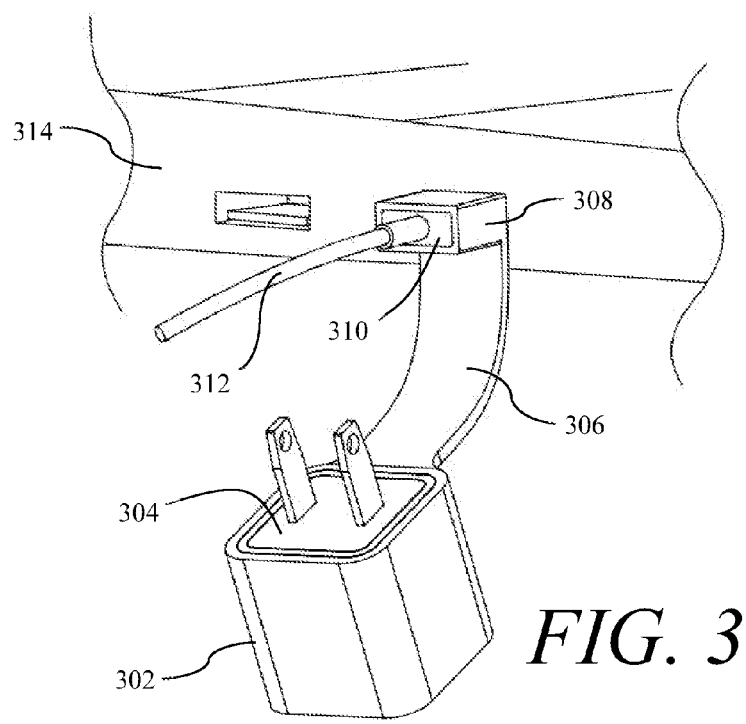
FIG. 3 is a perspective view of a casing system for a charging assembly showing a device connector remaining coupled with the casing system while engaged to a laptop

As shown in FIG. 3, a connector 310 may serve a different purpose, such as plugging into a computer 314 for data transfer and/or charging via connector 310 and cable 312. The cover 302 and extension 306 allow this to easily take place without having to remove the cover 302 from the AC adapter 304 or the receiving end 308 from the connector 310.

Figure 4:
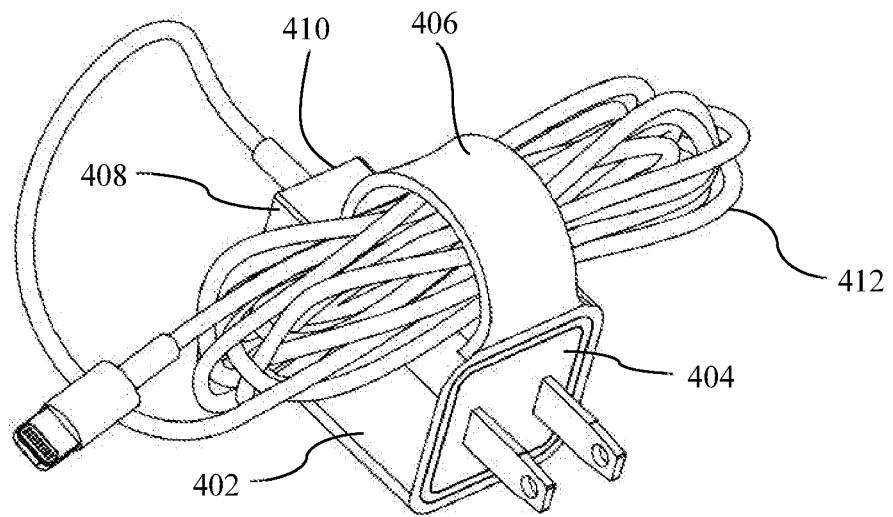
FIG. 4 is a top side perspective view of a casing system wherein the cable is fastened to the AC adapter using an extension

As shown in FIG. 4, a cover 402 around AC adapter 404 may use extension 406 to fasten a cable 412 by engaging the connector 410 to the receiving port (e.g., a USB type-A receiver) on the AC adapter 404 (similarly shown in FIG. 2). For example, a user desiring to store his/her cable 412, whether for storage or transportation, may simply wind or coil the cable 412, place it in between the extension 406 and the receiving port of the AC adapter 404, and then engage the connector 410 to the receiving port, thereby fastening the cable 412 to the adapter. It will be appreciated that while the extension shown is that of an integral part and having a receiving portion, the extension and securing method may be that of hook and loop or snaps, as mentioned in an earlier embodiment, and does not require a receiving portion— which is useful for AC adapters that do not have a removable cable. In other words, in another embodiment (not shown), the cover may have Velcro® strips, or their equivalent, attached to opposing sides of the cover, allowing the cable to be fastened to the AC adapter by engaging the Velcro® strips one with another.

Figure 5:
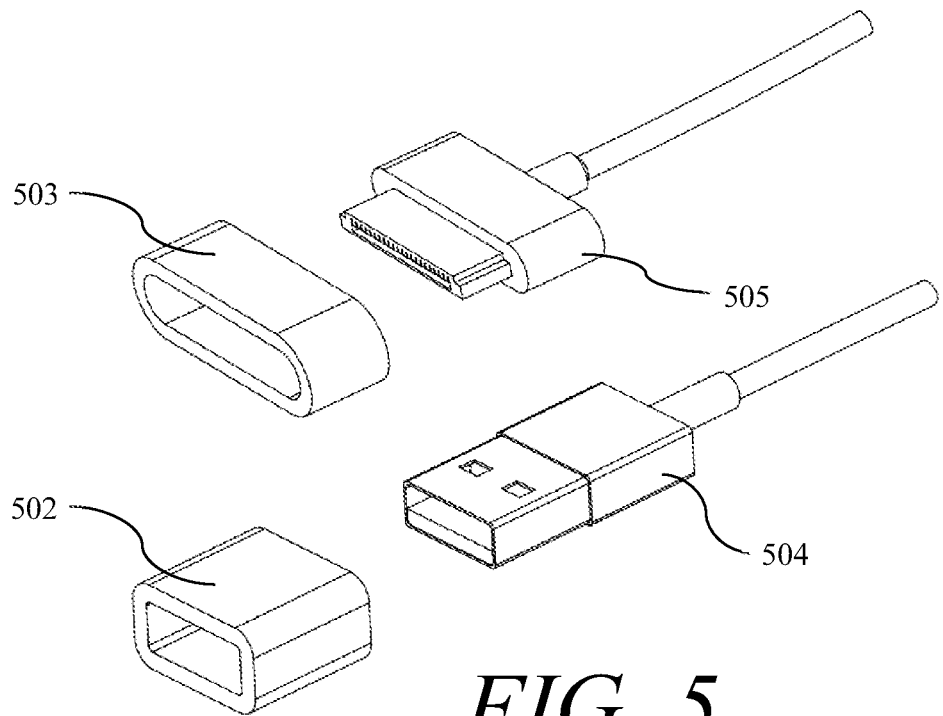
FIG. 5 is a perspective view of a casing system for device connectors of a charging assembly

In yet another embodiment, as shown in FIG. 5, a casing system comprises a cover 502, 503 for the device connector 504, 505 (e.g., USB type connectors, Apple® Lighting connectors, etc.). Covers 502, 503 may be made from the same materials as the covers mentioned in other embodiments.

Further, another embodiment (not shown) may include a cover for the cable portion of a charger assembly. The cable cover may be of a flexible material in a tubular structure that stretches to allow the cable to be received through it in a tube-like manner, which then returns to an unstretched state, residing on the cable. In other embodiments, the cable cover may be wrapped or braided in appearance and wrapped or braided around the cable. The cable cover color may complement or contrast the colors of the other covers in the system. In some embodiments, the cable cover may be marketed separately for use in identifying individual cables.

What is claimed is:

1. A method of identifying a charging assembly and fastening a cable thereof, the method comprising:
    coupling a cover having four sides to an AC adapter, the cover comprising an extension integrally formed with the cover and having a receiving end at a distal portion of the extension for receiving a USB connector;
    coupling the USB connector to the extension via the receiving end;
    coiling the cable associated with the USB connector;
    interposing the coiled cable between the AC adapter cover and the USB connector so that the extension secures the coiled cable to the AC adapter cover when the USB connector is inserted into a receiving port of the AC adapter.

* * * * *